United States Patent [19]

Ohya et al.

[11] 4,060,650
[45] Nov. 29, 1977

[54] METHOD FOR PREVENTING OR ELIMINATING WATER-ABSORPTION WHITENING OF A MOLDED ARTICLE CONTAINING AN ACRYLONITRILE POLYMER OR COPOLYMER

[75] Inventors: Masaki Ohya; Mitsuru Hoshino, both of Iwaki, Japan

[73] Assignee: Kureha Kagaku Kogyo Kabushiki Kaisha, Tokyo, Japan

[21] Appl. No.: 699,400

[22] Filed: June 24, 1976

[30] Foreign Application Priority Data

June 24, 1975 Japan .................................. 50-76528

[51] Int. Cl.² ................................................ B05B 5/00
[52] U.S. Cl. ......................................... 427/161; 8/65; 8/66; 264/182; 264/341; 264/343; 427/430 R

[58] Field of Search ............... 8/65, 66; 264/182, 341, 264/343; 427/161, 430 R

[56] References Cited

U.S. PATENT DOCUMENTS

| | | | |
|---|---|---|---|
| 2,209,940 | 7/1940 | Smith .............................. | 264/341 X |
| 3,399,260 | 8/1968 | Nakagawa et al. .................. | 264/182 |
| 3,406,145 | 10/1968 | Hennes .............................. | 264/182 X |
| 3,681,004 | 8/1972 | Torrance .......................... | 264/182 X |

*Primary Examiner*—Michael R. Lusignan
*Attorney, Agent, or Firm*—Sughrue, Rothwell, Mion, Zinn and Macpeak

[57] ABSTRACT

A method for preventing or eliminating water-absorption whitening of a molded article containing an acrylonitrile polymer or copolymer which comprises immersing the molded article into an aqueous medium containing a salt.

11 Claims, No Drawings

METHOD FOR PREVENTING OR ELIMINATING WATER-ABSORPTION WHITENING OF A MOLDED ARTICLE CONTAINING AN ACRYLONITRILE POLYMER OR COPOLYMER

BACKGROUND OF THE INVENTION

1. Field of the Invention

The present invention relates to a method for preventing or eliminating water-absorption whitening of a molded article containing an acrylonitrile polymer or copolymer.

2. Description of the Prior Art

An acrylonitrile polymer or copolymer has excellent gas-impermeability and transparency, and due to these properties it is used in the fields of receptacles for aerated drinks and casings for foods. In these fields, the receptacles and casings are exposed to an aqueous medium at high temperature for washing and sterilizing treatments. However, where the molded article of an acrylonitrile polymer or copolymer is exposed to an aqueous medium at a high temperature, there is the defect that transparency remarkably deteriorates, whereby appearance as a receptacle and casing is remarkably impaired.

Therefore, it has been strongly desired to obtain molded articles of acrylonitrile polymers or copolymers which do not remarkably deteriorate in transparency even though they are exposed to an aqueous medium at a high temperature.

It has further been desired to remove the water absorption whitening of molded articles of acrylonitrile polymers or copolymers to provide transparent molded articles thereof.

SUMMARY OF THE INVENTION

As a result of research to overcome the above defects, the inventor found that where at least one kind of specific salt is added to an aqueous medium in an amount such that the concentration is from about 5% by weight to the saturation amount thereof, the transparency of a molded article of an acrylonitrile polymer or copolymer can be maintained without the remarkable deterioration thereof, even though the molded article is exposed to the aqueous medium at a high temperature, and further found that where a nontransparent molded article of an acrylonitrile polymer or copolymer (due to the water-absorption whitening) is immersed in the above-mentioned salt-containing aqueous medium at a high temperature, the whitening can be removed whereby a transparent molded article can be obtained again.

Therefore, the present invention provides a method for eliminating the above defects.

One object of the present invention is to provide a method for preventing the water-absorption whitening of a molded article of an acrylonitrile polymer or copolymer by immersing the molded article into an aqueous medium containing at least one kind of salt.

Another object of the present invention is to provide a method for eliminating water-absorption whitening of a nontransparent molded article of an acrylonitrile polymer or copolymer (due to the water-absorption whitening) by immersing the nontransparent molded article into an aqueous medium containing at least one kind of salt.

DETAILED DESCRIPTION OF THE INVENTION

According to the method of the present invention, there are the advantages that washing and sterilizing treatments of molded articles containing an acrylonitrile polymer or copolymer can be easily carried out in an aqueous medium at high temperature without deteriorating transparency and that the transparency of a non-transparent molded article due to the water-absorption whitening can be restored.

The acrylonitrile polymers used in the present invention include homopolymers of a nitrile-containing olefinic monomer, and the acrylonitrile copolymers used in the present invention include copolymers of at least about 50% by weight of the nitrile-containing olefinic monomer and up to about 50% by weight of at least one olefinically unsaturated comonomer.

The nitrile-containing olefinic monomer is a compound represented by the general formula

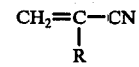

wherein R represents hydrogen, a halogen or an alkyl group having 1 to 4 carbon atoms.

Examples of the nitrile-containing olefinic monomer include acrylonitrile, α-chloroacrylonitrile, α-fluoroacrylonitrile, methacrylonitrile, ethacrylonitrile or the like.

Examples of the olefinically unsaturated comonomer include alkyl esters of acrylic acid and methacrylic acid, each having 1 to 12 carbon atoms in the alkyl moiety, such as methyl acrylate, ethyl acrylate, butyl acrylate, methyl methacrylate, ethyl methacrylate, butyl methacrylate or the like; a vinyl ester of a carboxylic acid having 2 to 12 carbon atoms such as vinyl acetate, vinyl propionate or the like; an alkyl vinyl ether having 1 to 12 carbon atoms such as methyl vinyl ether, ethyl vinyl ether, butyl vinyl ether or the like; an α-olefin having 2 to 8 carbon atoms such as ethylene, propylene, isobutylene, butene-1 or the like; a compound of the formula CH$_2$=CHX (wherein X is a halogen or an aromatic group) such as vinyl chloride, styrene or the like; a compound of the formula

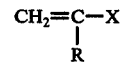

(wherein R is a halogen or an alkyl group having 1 to 2 carbon atoms and X is a halogen or an aromatic group such as a phenyl group) such as vinylidene chloride, α-chlorostyrene, α-methylvinyl chloride, α-methyl styrene or the like; maleimide; a copolymerizable N-substituted maleimide such as N-phenyl maleimide, N-4-diphenyl maleimide, N-1-naphthyl maleimide or the like.

The method according to the present invention is effective not only on the above-described molded articles of an acrylonitrile polymer or copolymer but also on a composition prepared by blending 1 to 30% by weight of a synethetic rubber or a natural rubber with an acrylonitrile polymer or copolymer and also a composition prepared by grafting 1 to 30% by weight of the synthetic rubber or natural rubber with the acrylonitrile polymer or copolymer.

The synthetic or natural rubber include a butadiene polymer; a copolymer of butadiene and a monomer copolymerizable therewith (such as a copolymer of butadiene with acrylonitrile, an acrylic acid alkyl ester or methacrylic acid alkyl ester, or the like); a conjugated diene rubber ( such as isoprene, neoprene or the like); an olefinic rubber (such as a copolymer of ethylene and propylene, or the like); a chlorinated olefinic rubber; or the like.

Further, the method according to the present invention is also effective on composite products of the acrylonitrile polymer or copolymer and another polymer, such as a polyolefin composite film, as well as a molded article of the acrylonitrile polymer or copolymer alone.

The present invention is of general application to solid acrylonitrile-comprising materials as above discussed, and the molecular weight of materials treatable in accordance with the present invention is not limited in any specific fashion. Conventionally, materials treatable in accordance to the present invention (excluding graft copolymers) have a viscosity $\eta$ sp/c of about 0.04 to about 0.8 1/g (in dimethylformamide at 30° C).

The salt used in the present invention is a halide (except for an iodide), a nitrate or an acetate of an element included in Groups I, II, III and VIII, Periods 1 to 4 of the Periodic Table (except for zinc). The salt must have a solubility in water at the temperature of use of at least 10% by weight.

Examples of the salt include NaCl, KCl, NaBr, $MgCl_2$ $CaCl_2$, $MgBr_2$, $CaBr_2$, $AlCl_3$ $AlBr_3$, $FeCl_2$, $FeCl_3$, $NaNO_3$, $KNO_3$, $Mg(NO_3)_2$, $Ca(NO_3)_2$, $Al(NO_3)_3$, $Fe(NO_3)_2$, $Fe(NO_3)_3$, $CH_3COONa$ or the like. An iodide of such an element, such as NaI, or a zinc salt, such as $ZnCl_2$, cannot be used in the method of the present invention since the molded article of the acrylonitrile polymer or copolymer swells or dissolves in an aqueous medium at high temperature containing those salts.

The salt added to the aqueous medium is not limited to one salt and a mixture of the salts can be used.

An amount of the salt added to the aqueous medium is from about 5% by weight to a saturation amount of the salt in water at the temperature of use, preferably the saturation amount or in the vicinity thereof.

In the case of preventing water-absorption whitening, such is generally conducted at the time of cooking or sterilizing the molded article itself or foods filled therein. Therefore, the parameters of treatment, such as the temperature of aqueous medium, the immersion time, etc., are determined by the cooking or sterilizing conditions. However, according to the method of the present invention, a temperature of the aqueous medium of from about 30° C to the boiling point of the aqueous medium is in general effective to obtain satisfactory effects.

In the case of eliminating water-absorption whitening, the temperature of the aqueous medium is generally from about 65° C to the boiling point, preferably from about 80° C to the boiling point. The immersion time varies depending upon the immersion temperature and the water-absorption amount. That is, the immersion time can be shortened as the immersion temperature becomes higher and the water-absorption amount in the molded article becomes smaller.

The method of the present invention is most conveniently performed at atmospheric pressure. Nothing prohibits the use of sub- or super-atmospheric pressure, but nothing is gained in the sense of increased process efficiency or superior product capabilities by utilizing such more complicated systems, and, accordingly, seldom will such ever be used.

In most instances, in the case of preventing water-absorption whitening the treatment is conducted for at most 30 days, while for eliminating water-absorption whitening, the treatment is generally conducted in a period of time of from about 1 minute to about 10 days, more preferably from 1 minute to 2 hours.

Further, the degree of restoration of the transparency varies depending upon the salt concentration and the immersion time.

The present invention will be illustrated more specifically by reference to the following examples, but it is to be understood that they are included merely for purposes of illustration and are not intended to be construed as limiting the scope of the present invention.

EXAMPLE 1

An acrylonitrile copolymer comprising 75% by weight of acrylonitrile and 25% by weight of methyl acrylate [viscosity $\eta$ sp/c = 0.08 1/g (in dimethylformamide at 30° C)] was pressed by means of a compression machine at 200° C to obtain a sheet having a thickness of 1 mm. The sheet obtained was immersed in water containing a salt at the concentration as shown in Table I below at 90° C for 30 minutes. The haze value of the sheet 30 minutes after and 24 hours after the immersion treatment were measured according to the criteria of ASTM D1003-61. For the sake of comparison, water containing no salt was also used.

The results obtained are shown in Table 1 below.

Table 1

| Run No. | Salt | Salt Concentration (wt. %) | Haze Value (%) Before Immersion | 30 Min. After Immersion Treatment | 24 Hours After Immersion Treatment |
| --- | --- | --- | --- | --- | --- |
| 1. (Control) | — | 0 | 6.7 | 90.9 | 97.0 |
| 2. (Invention) | NaCl | 10 | 6.1 | 43.1 | 88.6 |
|  |  | 15 | 6.8 | 19.1 | 46.6 |
|  |  | 20 | 6.2 | 8.1 | 9.0 |
|  |  | Saturation | 6.1 | 8.1 | 9.0 |
| 3. (Invention) | KCl | 10 | 6.0 | 60.5 | 95.5 |
|  |  | 20 | 6.8 | 28.7 | 66.1 |
|  |  | Saturation | 6.2 | 7.6 | 8.4 |
| 4. (Invention) | NaBr | 25 | 6.1 | 14.7 | 32.4 |
|  |  | Saturation | 6.1 | 8.3 | 9.5 |
| 5. (Invention) | $CaCl_2$ | 5 | 6.5 | 40.0 | 87.0 |
|  |  | 10 | 6.8 | 11.2 | 18.7 |
|  |  | 25 | 6.6 | 7.5 | 8.7 |
| 6. (Invention) | $MgBr_2$ | 25 | 6.4 | 55.0 | 92.5 |
|  |  | Saturation | 6.5 | 9.0 | 10.5 |
| 7. (Invention) | $AlCl_3$ | 10 | 6.5 | 49.8 | 92.2 |
|  |  | 20 | 7.7 | 10.3 | 11.2 |
| 8. (Invention) | $NaNO_3$ | 30 | 7.1 | 25.2 | 59.9 |
| 9. (Invention) | $Ca(NO_3)_2$ | 30 | 6.5 | 9.7 | 10.9 |

Table 1-continued

| Run No. | Salt | Salt Concentration | Haze Value (%) Before Immersion | 30 Min. After Immersion Treatment | 24 Hours After Immersion Treatment |
|---|---|---|---|---|---|
| 10. (Invention) | $CH_3CO_2Na$ | 50 | 6.5 | 8.5 | 9.7 |

EXAMPLE 2

The same procedure as in Example 1 was repeated except for using an acrylonitrile copolymer composition prepared by blending 20 parts by weight of a rubber component which was prepared by grafting 50 parts by weight of a monomer mixture of 60% by weight of acrylonitrile and 40% by weight of ethyl acrylate onto 50 parts by weight of a copolymer comprising 80% by weight of butadiene and 20% by weight of methyl acrylate, with 80 parts by weight of a copolymer comprising 75% by weight of acrylonitrile and 25% by weight of methyl acrylate.

The results obtained are shown in Table 2 below.

Table 2

| Run No. | Kind of Salt | Concentration of Salt (wt.%) | Haze Value (%) Before Immersion | 30 Min. After Immersion Treatment | 24 Hours After Immersion Treatment |
|---|---|---|---|---|---|
| 1. (Control) | — | 0 | 6.0 | 90.8 | 96.0 |
| 2. (Invention) | NaCl | 20 | 6.5 | 8.1 | 9.2 |
|  |  | Saturation | 6.7 | 8.0 | 9.0 |
| 3. (Invention) | $CaCl_2$ | 10 | 7.1 | 10.0 | 17.5 |
|  |  | 20 | 6.8 | 8.0 | 9.1 |

EXAMPLE 3

The same procedure as in Example 1 was repeated except for using a saturated NaCl aqueous solution and changing the immersion treatment time.

The results obtained are shown in Table 3 below.

Table 3

| Immersion Treatment Time (hr.) | Before Immersion | 24 Hours after Immersion Treatment |
|---|---|---|
| 0.5 | 6.1 | 9.0 |
| 1 | 6.7 | 10.0 |
| 2 | 6.3 | 9.7 |
| 6 | 6.3 | 52.4 |

EXAMPLE 4

Using a copolymer film comprising 75% by weight of acrylontrile and 25% by weight of methyl acrylate having a thickness of 20 $\mu$ ]viscosity $\eta$ sp/c = 0.08 l/g (in dimethylformamide at 30° C)], a polyethylene film having a thickness of 50 $\mu$ and a polypropylene film having a thickness of 70 $\mu$, three laminate films were prepared using an urethane adhesive as an adhesive (Nipporan 3002-Colonate L, manufactured by Nippon Polyurethane Industry Co., Ltd.).

Each of the laminate films obtained was treated under the conditions shown in Table 3 below. The laminate films thus treated were allowed to stand for one week at room temperature and the transparency thereof was visually judged.

For the sake of comparison, a copolymer film of 75% by weight of acrylonitrile and 25% by weight of methyl acrylate having a thickness of 20 $\mu$ was treated as described and judged.

The results obtained are shown in Table 4 below.

Table 4

| Sample Tested | Control Water | | | Invention Saturated NaCl aqueous solution | | |
|---|---|---|---|---|---|---|
|  | 75° C 30min. | 85° C 30 min. | 95° C 30 min. | 75° C 30 min. | 85° C 30 min. | 95° C 30 min. |
| I* | non-transparent | non-transparent | non-transparent | transparent | transparent | transparent |
| Polyethylene/I/polyethylene | " | " | " | " | " | " |
| Polypropylene/I/polypropylene | slightly non-transparent | " | " | " | " | " |
| Polyethylene/I/polypropylene | non-transparent | " | " | " | " | " |

Note
*A copolymer film of 75% by weight of acrylonitrile and 25% by weight of methylacrylate having a thickness of 20 $\mu$.

EXAMPLE 5

The sheet used in Example 1 was immersed under the immersion conditions shown in Table 5 below to obtain a non-transparent sheet. The water-absorption amount and the Haze value of the non-transparent sheet obtained were measured and are shown in Table 5 below.

The non-transparent sheet was again immersed in a saturated NaCl aqueous solution under the immersion conditions shown in Table 5 below. The Haze value of the sheet after reimmersion was measured and is shown in Table 5 below.

Table 5

| Before Reimmersion | | | | | After Reimmersion | | | |
|---|---|---|---|---|---|---|---|---|
| Immersion Medium | Immersion Temp. (° C) | Immersion Time (min.) | Water Absorption Amount (wt.%) | Haze Value (%) | Reimmersion Medium | Reimmersion Temp. (° C) | Reimmersion Time (min.) | Haze Value 10 Min. After Reimmersion Treatment (%) |
| Water | 90 | 150 | 4.9 | 96.2 | Saturated NaCl | 90 | 60 | 57.2 |

Table 5-continued

| | Before Reimmersion | | | | After Reimmersion | | | |
|---|---|---|---|---|---|---|---|---|
| Immersion Medium | Immersion Temp. | Immersion Time | Water Absorption Amount | Haze Value | Reimmersion Medium | Reimmersion Temp. | Reimmersion Time | Haze Value 10 Min. After Reimmersion Treatment |
| | | | | | aqueous soln. | | | |
| | | | | | " | 90 | 120 | 26.7 |
| | | | | | " | 90 | 150 | 18.3 |
| Water | 90 | 30 | 2.2 | 86.2 | Saturated NaCl aqueous soln. | 90 | 30 | 9.1 |
| Water | 90 | 30 | 0.7* | 96.0* | Saturated NaCl aqueous soln. | 90 | 10 | 23.0 |
| | | | | | " | 90 | 20 | 10.8 |
| Water | 90 | 30 | 0.7* | 96.0* | Saturated NaCl aqueous soln. | 80 | 30 | 18.0 |

Note
*Values of the sample which was dried at room temperature for one week after the first immersion treatment.

As is apparent from the results in Examples 1 to 4, the use of an aqueous medium containing a specific salt according to the present invention provides excellent effects in preventing water-absorption whitening as compared with the use of water only.

It is further apparent from the results in Example 5 that the use of an aqueous medium containing specific salts according to the present invention can markedly improve the haze value of sheet as compared with the use of water only.

While the invention has been described in detail and with reference to specific embodiments thereof, it will be apparent to one skilled in the art that various changes and modifications can be made therein without departing from the spirit and scope thereof.

What is claimed is:

1. A method for preventing or eliminating the water-absorption whitening of a molded article containing an acrylonitrile polymer or copolymer which comprises immersing said molded article into an aqueous medium containing one or more salts selected from the group consisting of halides excluding iodide, a nitrate and an acetate of one or more element included in Groups I, II, III and VIII, Periods 1 to 4 of the Periodic Table, excluding zinc, and having a solubility in water at the temperature of use of at least about 10% by weight, in an amount of from about 5% by weight to the saturation amount of said salt.

2. The method as claimed in claim 1, wherein said molded article containing an acrylonitrile polymer or copolymer is a molded article of an acrylonitrile polymer or copolymer.

3. The method as claimed in claim 2, wherein said polymer is a homopolymer of a nitrile-containing olefinic monomer represented by the formula $$CH_2=C-CN$$
$$|$$
$$R$$

, wherein R represents hydrogen atom, a halogen atom or an alkyl group having 1 to 4 carbon atoms.

4. The method as claimed in claim 3, wherein said nitrile-containing olefinic monomer is acrylonitrile, α-chloroacrylonitrile, α-fluoroacrylonitrile, methacrylonitrile or ethacrylonitrile.

5. The method as claimed in claim 2, wherein said copolymer is a copolymer of at least 50% by weight of a nitrile-containing olefinic monomer and up to 50% by weight of an olefinically unsaturated comonomer.

6. The method as claimed in claim 5, wherein said olefinically unsaturated comonomer is selected from the group consisting of an alkyl ester of acrylic acid and methacrylic acid having 1 to 12 carbon atoms in the alkyl moiety, a vinyl ester of carboxylic acid having 2 to 12 carbon atoms, an alkyl vinyl ether having 1 to 12 carbon atoms, an α-olefin having 2 to 8 carbon atoms, a compound of the formula $$CH_2=C-X$$
$$|$$
$$R$$

wherein R is a halogen atom or an alkyl group having 1 to 2 carbon atoms and X is a halogen atom or an aromatic group, maleimide or a copolymerizable N-substituted maleimide.

7. The method as claimed in claim 1, wherein said molded article is a molded article of a composition comprising 99 to 70% by weight of an acrylonitrile polymer or copolymer and 1 to 30% by weight of a synthetic rubber or natural rubber.

8. The method as claimed in claim 7, wherein said synthetic rubber or natural rubber is selected from the group consisting of a butadiene rubber, a copolymer of butadiene and a monomer copolymerizable therewith, a conjugated diene rubber, an olefinic rubber and a chlorinated olefinic rubber.

9. The method as claimed in claim 1, wherein said molded article is a composite product of the acrylonitrile polymer or copolymer and other polymer.

10. The method as claimed in claim 1, wherein said salt is selected from the group consisting of NaCl, KCl, NaBr, $MgCl_2$, $CaCl_2$, $MgBr_2$, $CaBr_2$, $AlCl_3$, $AlBr_3$, $FeCl_2$, $FeCl_3$, $NaNO_3$, $KNO_3$, $Mg(NO_3)_2$, $Ca(NO_3)_2$, $Al(NO_3)_3$, $Fe(NO_3)_2$, $Fe(NO_3)_3$, $CH_3COONa$ and mixtures thereof.

11. The method as claimed in claim 1, wherein said aqueous medium containing one or more of said salts does not dissolve or swell said molded article containing acrylonitrile polymer or copolymer.

* * * * *